Patented Sept. 3, 1946

2,407,181

UNITED STATES PATENT OFFICE 2,407,181

ARTIFICIAL WAXES AND GREASES

Samuel Le Roy Scott, Wilmington, Del., assignor to E. I. du Pont de Nemours & Company, Wilmington, Del., a corporation of Delaware No Drawing. Application March 30, 1944, Serial No. 528,770

8 Claims. (Cl. 260—2)

This invention relates to the reaction of a polymerizable aliphatic monoolefinic hydrocarbon with a silicon halide and to novel products resulting therefrom.

This invention has as an object the preparation of wax-like polymeric products from a polymerizable aliphatic monoolefinic hydrocarbon and a silicon halide. The further object is the preparation of wax-like compounds from ethylene and a silicon halide. Other objects will appear hereinafter.

These objects are accomplished by the following invention wherein a polymerizable monoolefinic aliphatic hydrocarbon of from two to four carbon atoms is reacted with a silicon halide of not more than twenty-one carbon atoms, having directly attached to silicon at least one halogen atom of atomic weight below 90, i. e., selected from the class consisting of fluorine, chlorine, and bromine.

The reaction is carried out in the absence of a Friedel-Crafts reaction catalyst and preferably in the presence of a catalyst which is effective for the polymerization of the monoolefinic hydrocarbon and ineffective in the Friedel-Crafts reaction.

The reaction of the silicon halide with the polymerizable aliphatic monoolefinic hydrocarbon, e. g., ethylene, to give wax-like products is carried out in general as follows: A reaction apparatus, a pressure reactor capable of being heated and provided with a means of agitation, is equipped with inlet tubes for admitting a gaseous monoolefinic hydrocarbon such as ethylene, a vent connected to a safety rupture disc, and a pressure gauge. The liquid charge, which consists of a silicon halide such as silicon tetrachloride, and usually small amounts of a catalyst (0.1–5%) such as a peroxygen compound, e. g., diethyl peroxide, with or without inert organic solvents such as cyclohexane, is placed in the pressure reactor. The reactor is then flushed with nitrogen, closed, the contents agitated by a suitable means such as stirring with an internal stirrer or by agitation of the reaction vessel, and ethylene is admitted. The pressure of ethylene for the reaction with silicon tetrachloride is preferably between 600 and 1000 atmospheres and the temperature at which the reaction is usually carried out is between 75 and 300° C. Pressures of from 20 to 1000 or more atmospheres may be used and the exact pressure and temperature employed is dependent upon such factors as the specific catalyst employed and properties desired in the resulting product.

The end of the reaction is indicated by the cessation of ethylene absorption. When this point is reached, the reaction mixture is allowed to cool, removed from the reactor, and the monomeric silicon halide, e. g., silicon tetrachloride, with any added inert organic solvents which may have been employed, is removed by distillation. The residue which is an organic material containing silicon and chlorine is greasy to wax-like in character, usually melting between 85° and 110° C., although lower melting products can be obtained. The reaction products produced by this reaction have molecular weights of between 400 and approximately 4000, although slightly higher molecular weight products can be obtained when silicon tetrafluoride is employed.

The mixtures obtained by this reaction of the silicon halide and the monoethylenically unsaturated hydrocarbon such as ethylene in the absence of a Friedel-Crafts catalyst are not readily amenable to separation by distillation or other means into their component parts and the mixture can be employed per se, since it is probably a mixture of functionally similar compounds.

In order that the process may be more fully understood, the following specific examples are given by way of illustration. In the examples, the parts given are parts by weight.

Example I

A pressure reactor was charged with 78 parts of cyclohexane, 30 parts of silicon tetrachloride, one part of hexachloroethane, and one part of mercuric chloride. The reactor was flushed with nitrogen, closed, and pressured to about 150 atmospheres pressure with ethylene. The temperature was then raised to 275° C. with a corresponding increase in pressure within the reactor to approximately 900 atmospheres. Over a reaction period of 16 hours, the pressure was maintained at 900 atmospheres by occasional injection of ethylene and during this period the total pressure drop was about 175 atmospheres. The reactor was cooled, ethylene bled off, and the product which consisted of a solid suspended in the cyclohexane was obtained. This solid material was filtered and dissolved in benzene, and the benzene solution filtered. After filtration, the benzene solution was heated to distill the unreacted silicon tetrachloride and after about ¾ of the benzene had also been distilled, the remainder of the benzene was removed by steam distillation and the product filtered from the water. After drying under reduced pressure at 100° C., the product, consisting of about 16 parts of a soft, tacky wax, was found to contain about 0.07% silicon and had a molecular weight of about 487 as determined by elevation of the boiling point of a benzene solution. The waxy product melted at about 85° C.

A similar reaction product was obtained when, in place of the hexachloroethane and mercuric chloride, 0.4 part of diethyl peroxide was used as catalyst under similar conditions.

*Example II*

A silver lined reaction vessel was charged with 85 parts of silicon tetrachloride, 0.5 part of potassium chlorate, and 0.1 part of manganese dioxide. The reactor was swept free of air with a current of nitrogen, closed, and ethylene admitted to the tube until a pressure of 150 atmospheres was obtained. The temperature of the tube was then raised to about 200° C. and additional ethylene added to bring the pressure to 900 atmospheres. The reactor was maintained at this temperature for about 14 hours and ethylene was occasionally admitted to maintain the pressure at about 900 atmospheres. At the end of this period, the reactor was cooled and the unreacted ethylene removed. The unreacted silicon tetrachloride was distilled from the reaction vessel by attaching the reactor to a vacuum line and reducing the pressure to about 10 mm. The solid product left within the reactor was rinsed with water and the water removed by filtration. The solid was dissolved in xylene, filtered, and methanol added to give a precipitate, which was then filtered from the xylene/methanol mixture. The product after drying in vacuum consisted of 23 parts of a waxy material softening at 87° C. and melting at 104° C. when heated on a copper bar. The product contained 0.55% silicon and 1.22% chlorine.

*Example III*

When a reaction was run in a manner similar to that of Example II except that for the potassium chlorate manganese dioxide mixture, there was substituted about 0.5 part of "Chloramine-T" as catalyst, a product was obtained which softened at 85° C. and melted at 104–110° C. when heated on a copper block. This product contained 0.91% silicon and 2.06% chlorine.

*Example IV*

A stainless steel pressure reactor was charged with 80 parts of benzene and 0.3 part of benzoyl peroxide. The reactor was closed, evacuated, and cooled by "Dry Ice." There was then added 50 parts of silicon tetrafluoride and the reactor was pressured to 600 atmospheres with ethylene. The reactor was heated to 80° C. and ethylene injected occasionally to maintain a pressure of 810–960 atmospheres. A pressure drop of 310 atmospheres occurred during a period of about nine hours after which the reactor was cooled and the ethylene and unreacted silicon tetrafluoride were bled off. There was obtained 25 parts of a solid which gave a waxy, brittle film. The solid product contained 0.14% silicon and 1.2% fluorine.

*Example V*

A stainless steel pressure reactor was charged with 0.5 part of potassium chlorate, 0.1 part of manganese dioxide, and 25 parts of dimethylsilicon dichloride. Ethylene was introduced and maintained at 850–950 atmospheres while the reactor was heated to 198–201° C. At the end of nine hours, during which there was a total pressure drop of 105 atmospheres, the reactor was cooled and the ethylene bled off. The reactor was then warmed and evacuated to remove unreacted dimethylsilicon dichloride. There was obtained seven parts of a waxy product (purified by precipitation from xylene/methanol mixture) which contained 0.11% silicon and 1.10% chlorine. The waxy product melted at 106–109° C.

The above described reaction between silicon halides and an olefin can be carried out with any polymerizable aliphatic monoolefinic hydrocarbon capable of being polymerized when treated with a peroxygen catalyst. Although ethylene undergoes the reaction with silicon tetrachloride readily, other monoolefinic hydrocarbons having from two to four carbon atoms and which preferably have a $CH_2=CH-$ (vinyl group) may be used.

In the process of this reaction there may be employed any silicon halide having at least one halogen of atomic weight below 90, i. e., fluorine, chlorine or bromine directly attached to silicon including $(C_2H_5O)_2SiCl_2$, $C_2H_5OSiCl_3$, $(CH_3)_2SiCl_2$, $SiCl_4$, $Si_2Br_6$, $SiBr_4$, $SiF_4$, $SiF_2Cl_2$, $Si(CH_3)Cl_3$, $SiHCl_3$, $Si(CH_3)F_3$, $Si(CH_3)_2Cl_2$, $C_6H_5CH_2SiCl_3$, $Si(C_2H_5)_2Cl_2$, $(C_6H_5CH_2)_2SiCl_2$, $SiH_3Cl$, $(C_6H_5)_3SiF$, $(C_2H_5)_3SiCl$, $(C_6H_5CH_2)_3SiCl$.

Although the reaction of the present invention can occur in the absence of substantial amounts of a catalyst, it is preferred to use a catalyst which is effective for the polymerization of the olefinic hydrocarbon and which is ineffective as a catalyst for Friedel-Crafts reactions, (i. e., alkylation or acetylation reactions). By way of example, the following suitable catalysts may be mentioned as effective for the reaction between silicon halides and an olefinic hydrocarbon such as ethylene: peroxygen compounds, e. g., diacyl peroxides such as acetyl peroxide, dibenzoyl peroxide, and lauroyl peroxide; dialkyl peroxides such as diethyl peroxide; other peroxides such as ascaridole, cyclohexanone peroxides; ammonium persulfate, perborate, and percarbonate; molecular oxygen; amine oxides, for example, trimethylamine oxide; oxygen-containing compounds such as manganese dioxide, perchlorate, etc.; such metal alkyls as tetraethyllead and tetraphenyllead; ultraviolet light, especially in the presence of such photosensitizers as mercury; dibenzoylhydrazine, hydrazine dihydrochloride; N-halomines, e. g., "Chloramine-T"; and tetrachloroethane. Combinations of some of these compounds with other compounds, for example with mercuric chloride, are also useful. These compounds or combinations are effective as catalysts for the polymerization of ethylene under the conditions of temperature and pressure that are necessary. In general, these catalysts have been termed "telomerization catalysts" as described in pending application, Serial Number 438,466. These catalysts are usually employed in amounts varying from about 0.01 to 5.0% by weight as based on the silicon halide present. When molecular oxygen is employed as a catalyst, its concentration should be less than 1000 parts per million as based on the polymerizable olefinic hydrocarbon employed.

To obtain the polymeric products of this invention the reaction is to be carried out in the absence of a Friedel-Crafts reaction catalyst such as a halide of an amphoteric metal, e. g., aluminum trichloride, since the reaction in the presence of a Friedel-Crafts type catalyst leads to low molecular weight, non-polymeric compounds containing one unit derived from the silicon halide and one from the olefine.

To obtain a sufficient concentration of polymerizable olefinic hydrocarbon, such as ethylene, it is necessary usually to employ superatmospheric pressure. Although pressures of 20–1000 atmospheres can be used for this reaction, the ultimate pressure limit for the reaction is only that which the equipment available will stand and accordingly pressures higher than 1000 atmospheres may be used. Pressure is used principally as a means of obtaining sufficient concentration of olefins at the temperatures desired.

In a similar manner the temperature for the reaction of silicon halides with the polymerizable aliphatic monoolefinic hydrocarbons may be varied within wide limits and is dependent usually upon the catalyst employed. For the majority of cases, temperatures of 50° to 300° C. are employed. For such catalysts as those having directly linked oxygen atoms such as the peroxy compounds, the temperature range is usually 50° to 150° C. For molecular oxygen, hexachloroethane, chlorate-manganese dioxide mixtures, the temperature required for catalytic action is usually between 125° and 300° C.

Inert diluents such as isooctane, cyclohexane, benzene or similar aliphatic, cycloaliphatic or aromatic hydrocarbons may be employed. It is preferred to use low boiling solvents which can readily be removed by distillation of the reaction mixture. The reaction should be carried out under anhydrous conditions to avoid hydrolysis of the silicon halides. The compounds resulting from the polymerization of ethylene with silicon halides, e. g., silicon tetrachloride, are wax-like materials having molecular weights between 400 and 4000 although higher molecular weight values may be obtained by adjustments in the proportions of silicon halide and catalysts employed, and in choice of temperature and pressure, i. e., the concentration of olefin employed. In general, the molecular weight of the polymeric material is increased by increasing the pressure, i. e., increasing the relative concentration of ethylene. The molecular weight is also increased by decreasing the reaction temperature and/or decreasing the catalyst concentration. Materials of higher average molecular weights, e. g., up to 15,000 may be obtained when silicon tetrafluoride is used. It is probable that small amounts of polymers of ethylene are also formed during the silicon halide-ethylene reaction.

The products obtained by the above described reaction are different from monomeric addition products of silicon halides with an ethylenically unsaturated hydrocarbon and also differ in molecular weight and other properties from the polymerizable products of ethylene or other monoolefinic hydrocarbons when prepared in the absence of the silicon halide. It is probable that there are produced in this reaction compounds of the general formula $A(CH_2CH_2)_nB$ in which $n$ is a plural integer and A and B together form a silicon halide. In the case of the reaction employing ethylene and silicon chloride the product comprises reaction products of the formula $Cl(CH_2CH_2)_nSiCl_3$ where $n$ is a plural integer. Some of the halogens of such compounds are probably removed when the reaction product is subjected to mild hydrolysis, for example as during purification. This type of reaction is called "telomerization" and has been described in pending application, Serial Number 438,466.

The wax-like polymeric products of this invention are useful in the preparation of polishes such as automobile polishes, floor polish, shoe polish, emulsion floor polish, and other places where carnauba or similar waxes have found employment. These waxes similarly are useful as modifiers for lubricating oil, paper coating, and impregnation as for example as a textile finish and similar applications. The higher molecular weight products can be fabricated into self-supporting films, etc.

The above description and examples are intended to be illustrative only. Any modification thereof or variation therefrom which conforms to the spirit of the invention is intended to be included within the scope of the claims.

What is claimed is:

1. Process for the preparation of greasy to waxy, silicon-containing, polymeric materials which comprises reacting ethylene with a silicon halide containing not more than twenty-one carbon atoms and having directly attached to silicon at least one halogen selected from the class consisting of fluorine, chlorine, and bromine, at 50–300° C. and a pressure of at least 20 atmospheres, any catalyst present being a polymerization catalyst ineffective in the Friedel-Crafts reaction.

2. Process for the preparation of greasy to waxy, silicon-containing, polymeric materials which comprises reacting ethylene with silicon tetrachloride at 50–300° C. at an ethylene pressure of at least 20 atmospheres, any catalyst present being a polymerization catalyst ineffective in the Friedel-Crafts reaction.

3. Process for the preparation of greasy to waxy, silicon-containing, polymeric materials which comprises reacting ethylene with silicon tetrachloride at 50–300° C. at an ethylene pressure of at least 20 atmospheres, any catalyst present being a potassium chlorate-manganese dioxide catalyst.

4. A greasy to waxy, silicon- and halogen-containing, polymeric product of the reaction, at 50–300° C. and a pressure of at least 20 atmospheres, of a silicon halide containing not more than twenty-one carbon atoms having directly attached to silicon at least one halogen selected from the class consisting of fluorine, chlorine, and bromine, with ethylene, any catalyst present being a polymerization catalyst ineffective in the Friedel-Crafts reaction.

5. A greasy to waxy polymeric product of the reaction, at 50–300° C. and a pressure of at least 20 atmospheres, of silicon tetrachloride with ethylene, any catalyst present being a polymerization catalyst ineffective in the Friedel-Crafts reaction.

6. A greasy to waxy polymeric product of the reaction, at 50–300° C. and a pressure of at least 20 atmospheres, of silicon tetrachloride with ethylene, any catalyst present being potassium chlorate-manganese dioxide catalyst.

7. Process which comprises adding ethylene to a reaction charge consisting of silicon tetrachloride, potassium chlorate and manganese dioxide at a temperature of about 200° C. and maintaining a pressure of about 900 atmospheres by the addition of further ethylene for about fourteen hours.

8. A waxy material containing silicon and chlorine softening about 87° C. and melting about 104° C. obtained by the process of claim 7.

SAMUEL LE ROY SCOTT.

Certificate of Correction

Patent No. 2,407,181.  September 3, 1946.

SAMUEL LE ROY SCOTT

It is hereby certified that error appears in the printed specification of the above numbered patent requiring correction as follows: Column 4, line 22, for "$(CH_3)_2SiCl_4$" read $(CH_3O)_2SiCl_2$; and that the said Letters Patent should be read with this correction therein that the same may conform to the record of the case in the Patent Office.

Signed and sealed this 19th day of November, A. D. 1946.

[SEAL]

LESLIE FRAZER,
*First Assistant Commissioner of Patents.*